(12) United States Patent
Hwangbo et al.

(10) Patent No.: US 12,562,418 B2
(45) Date of Patent: Feb. 24, 2026

(54) BUTTON-TYPE SECONDARY BATTERY WITH NOTCHED CAP/TERMINAL BOND INTERFACE

(71) Applicant: LG ENERGY SOLUTION, LTD., Seoul (KR)

(72) Inventors: Kwang Su Hwangbo, Daejeon (KR); Geon Woo Min, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 716 days.

(21) Appl. No.: 17/796,701

(22) PCT Filed: Mar. 9, 2021

(86) PCT No.: PCT/KR2021/002875
§ 371 (c)(1),
(2) Date: Aug. 1, 2022

(87) PCT Pub. No.: WO2021/182835
PCT Pub. Date: Sep. 16, 2021

(65) Prior Publication Data
US 2023/0055864 A1 Feb. 23, 2023

(30) Foreign Application Priority Data

Mar. 11, 2020 (KR) ........................ 10-2020-0030313
Feb. 19, 2021 (KR) ........................ 10-2021-0022862

(51) Int. Cl.
*H01M 50/109* (2021.01)
*H01M 50/169* (2021.01)
(Continued)

(52) U.S. Cl.
CPC ....... *H01M 50/109* (2021.01); *H01M 50/169* (2021.01); *H01M 50/188* (2021.01); *H01M 50/566* (2021.01)

(58) Field of Classification Search
CPC ............. H01M 50/109; H01M 50/188; H01M 50/169; H01M 50/566
See application file for complete search history.

(56) References Cited

U.S. PATENT DOCUMENTS 3,294,591 A 12/1966 Jordan
4,804,593 A 2/1989 Hara et al.
(Continued)

FOREIGN PATENT DOCUMENTS

CN 105958109 A 9/2016
CN 106159350 A 11/2016
(Continued)

OTHER PUBLICATIONS

JP 11106892 English Translation (Year: 1999).*
(Continued)

*Primary Examiner* — Jimmy Vo
(74) *Attorney, Agent, or Firm* — Birch, Stewart, Kolasch & Birch, LLP

(57) ABSTRACT

A button-type secondary battery having a cup which has an opened upper side and in which an electrode assembly and an electrolyte are mounted; a top plate which is coupled to an upper end of the cup to close the opened upper side of the cup and in which a through-hole is formed; a positive electrode terminal including a protrusion having a diameter capable of being inserted into the through-hole and a hook having a diameter greater than that of the through-hole, the protrusion being inserted into the through-hole so that the hook is disposed outside or inside the cup; and a gasket inserted to insulate a portion at which the protrusion and the hook are in contact with the top plate when the protrusion of the positive electrode terminal is inserted into the through-hole. The gasket bonds the positive electrode terminal to the top plate.

17 Claims, 7 Drawing Sheets

(51) Int. Cl.
    *H01M 50/188*     (2021.01)
    *H01M 50/566*     (2021.01)

(56)         References Cited

U.S. PATENT DOCUMENTS

| | | | |
|---|---|---|---|
| 5,486,433 A | 1/1996 | Glaser | |
| 6,451,478 B1 | 9/2002 | Okahisa et al. | |
| 2002/0039685 A1 | 4/2002 | Choi et al. | |
| 2005/0206093 A1 | 9/2005 | Utsunomiya et al. | |
| 2011/0278803 A1 | 11/2011 | Yamazaki et al. | |
| 2015/0171481 A1 | 6/2015 | Yi et al. | |
| 2018/0114954 A1 | 4/2018 | Lee et al. | |
| 2018/0159092 A1 | 6/2018 | Barenberg et al. | |
| 2018/0241013 A1 | 8/2018 | Vuille et al. | |
| 2019/0214607 A1 | 7/2019 | Yildiz et al. | |
| 2019/0229303 A1 | 7/2019 | Vuille et al. | |
| 2019/0296319 A1 | 9/2019 | Choi et al. | |
| 2020/0168854 A1 | 5/2020 | Yildiz et al. | |
| 2021/0075051 A1 | 3/2021 | Zhou | |
| 2021/0111454 A1 | 4/2021 | Zhu et al. | |
| 2021/0328290 A1 | 10/2021 | Lee et al. | |
| 2023/0369653 A1 | 11/2023 | Choi et al. | |
| 2024/0030496 A1 | 1/2024 | Choi et al. | |

FOREIGN PATENT DOCUMENTS

| | | | | |
|---|---|---|---|---|
| CN | 107978699 A | | 5/2018 | |
| CN | 108461660 A | | 8/2018 | |
| CN | 109192889 A | | 1/2019 | |
| CN | 110459705 A | | 11/2019 | |
| CN | 210074040 U | | 2/2020 | |
| EP | 0 246 590 A2 | | 11/1987 | |
| JP | 53-81823 U | | 7/1978 | |
| JP | 62-93855 A | | 4/1987 | |
| JP | 8-260165 A | | 9/1994 | |
| JP | 11106892 A | * | 4/1999 | |
| JP | 3165417 B2 | | 5/2001 | |
| JP | 2006-40596 A | | 2/2006 | |
| JP | 2008-305646 A | | 12/2008 | |
| JP | 2009-76394 A | | 4/2009 | |
| JP | 2010-55992 A | | 3/2010 | |
| JP | 2010055992 A | * | 3/2010 | |
| JP | 5044933 B2 | | 10/2012 | |
| JP | 2012-234785 A | | 11/2012 | |
| KR | 10-0269923 B1 | | 10/2000 | |
| KR | 20-0286843 Y1 | | 8/2002 | |
| KR | 10-2002-0083086 A | | 11/2002 | |
| KR | 10-2009-0053133 A | | 5/2009 | |
| KR | 20090081411 A | * | 7/2009 | .......... H01M 50/184 |
| KR | 10-2018-0027266 A | | 3/2018 | |
| KR | 20180027266 A | * | 3/2018 | .......... H01M 50/147 |
| KR | 10-2018-0056102 A | | 5/2018 | |
| KR | 10-2018-0060697 A | | 6/2018 | |
| KR | 10-2018-0096520 A | | 8/2018 | |
| KR | 10-2019-0010566 A | | 1/2019 | |
| KR | 10-2019-0084888 A | | 7/2019 | |
| KR | 10-2020-0020619 A | | 2/2020 | |
| WO | 2008/059829 A1 | | 5/2008 | |

OTHER PUBLICATIONS

JP 2010055992 English Translation (Year: 2010).*
KR 20090081411 English Translation (Year: 2009).*
KR 20180027266 English Translation (Year: 2018).*
Extended European Search Report for European Application No. 21768736.7, dated Feb. 26, 2024.
International Search Report (PCT/ISA/210) issued in PCT/KR2021/002875 mailed on Jun. 11, 2021.
European Communication pursuant to Article 94(3) EPC for European Application No. 21768736.7, dated Sep. 17, 2025.

* cited by examiner

53

53b

BUTTON-TYPE SECONDARY BATTERY WITH NOTCHED CAP/TERMINAL BOND INTERFACE

TECHNICAL FIELD

The present application claims the benefit of the priority of Korean Patent Application Nos. 10-2020-0030313, filed on Mar. 11, 2020, and 10-2021-0022862, filed on Feb. 19, 2021, which are hereby incorporated by reference in their entirety.

The present invention relates to a button-type secondary battery, and more particularly, to a button-type secondary battery in which a coupling structure between a positive electrode terminal and a top plate is improved to reduce a thickness.

BACKGROUND ART

A button-type battery commonly used as a coin-type battery or a button-type battery has a thin button shape and is widely used in various devices such as remote controllers, clocks, toys, computer parts, and the like.

Such a button-type battery is mainly manufactured as a non-rechargeable primary battery, but is also widely manufactured as a secondary battery that is chargeable and dischargeable as miniaturized devices are developed. Also, the button-type secondary battery also has a structure in which an electrode assembly and an electrolyte are embedded in a case to repeatedly perform charging and discharging, like the button-type secondary battery or the cylindrical or pouch-type secondary battery.

In the button-type battery, when the electrode assembly is mounted on a lower can, an upper can is pressed onto the lower can to be coupled. However, in order to maximize an internal space and prevent deformation due to press-fitting, the button-type battery may be also manufactured in a structure in which the top plate is bonded to the cup through seam-welding.

FIG. 1 is a cross-sectional view of a button-type secondary battery according to the related art. As illustrated in FIG. 1, a button-type secondary battery using a deep seam-welding method comprises a cup 2 which has a flat cylindrical shape similar to a shape of a Petri-dish and of which an upper side is opened, and a top plate 3 coupled through laser or other welding manners to close the opened upper side of the cap 2.

A jelly roll-type electrode assembly 1, in which a positive electrode, a separator, and a negative electrode are stacked, and an electrolyte are mounted in the cup 2. Here, in the electrode assembly 1, a negative electrode tab (not shown) protruding from the negative electrode is electrically connected to a bottom surface of the cup 2, and a positive electrode tab 1a protruding from the positive electrode is electrically connected to the positive electrode terminal 5 (in some cases, the positive and negative electrode tabs may be connected in reverse to the cup and top plate). The positive electrode terminal 5 is coupled to the top plate 3, and a gasket 4 is inserted between the positive electrode terminal 5 and the top plate 3 so that the positive electrode terminal 5 and the top plate 3 are electrically insulated from each other.

In the structure according to the related art, the positive electrode terminal 5 is coupled to a hole formed in the top plate 3 by a riveting method. That is, after performing punching to form a hole in a center of the top plate 3, the positive electrode terminal 5 is inserted into the hole, and ends 5a and 5b are molded to be flat so as to be prevented from being separated from the top plate 3.

However, in the structure according to the related art, protruding portion of the positive electrode terminal 5 at each of both the upper end 5a and the lower end 5b of the top plate 5 has a diameter greater than an inner diameter of the hole, and there is a limit to reduce a thickness of the secondary battery due to molding conditions of the ends 5a and 5b of the positive electrode terminal 5. As described above, it is difficult to implement a thin riveting structure.

In more detail, it is difficult to reduce the thickness of the portion of the positive electrode terminal 5, which protrudes from the top surface of the top plate 3, and thus, it is difficult to miniaturize the secondary battery.

DISCLOSURE OF THE INVENTION

Technical Problem

Accordingly, an object of the present invention is to provide a button-type secondary battery that is more easily miniaturized by further reducing a thickness thereof.

Technical Solution

The present invention for achieving the above object provides a button-type secondary battery comprising: a cup having an opened upper side, the cup being configured to receive an electrode assembly and an electrolyte therein; a top plate coupled to an upper end of the cup to close the opened upper side of the cup, the top plate having a through-hole; a positive electrode terminal comprising a protrusion having a diameter capable of being inserted into the through-hole and a hook having a diameter greater than that of the through-hole, the protrusion being inserted into the through-hole so that the hook is disposed outside or inside the cup; and a gasket insulating a portion at which the protrusion and the hook are in contact with the top plate when the protrusion of the positive electrode terminal is inserted into the through-hole, wherein the gasket bonds the positive electrode terminal to the top plate.

The gasket may seal a gap between the positive electrode terminal and the top plate.

In the positive electrode terminal, the protrusion may be inserted into the through-hole of the top plate so that the hook is disposed at the outside of the cup, or the protrusion may be inserted into the through-hole of the top plate so that the hook is disposed at the inside of the cup.

In the positive electrode terminal, when heat is applied, the gasket may be thermally fused to bond the positive electrode terminal and the top plate to each other.

In the button-type secondary battery according to the present invention, ultrasonic waves may be applied to the gasket to fuse the gasket between the positive electrode terminal and the top plate.

The gasket may be inserted between the positive electrode terminal and the top plate in a state in which an adhesive is applied to a surface of the gasket.

Furthermore, a primer may be applied to the gasket, or plasma may be applied to the gasket, to deform a surface of the gasket before the adhesive is applied.

Each of a surface, on which the gasket and the top plate are in contact with each other, and each of a surface, on which the gasket and the positive electrode terminal are in contact with each other, may be formed as a flat surface.

Furthermore, at least one notch that is recessed by a predetermined depth from each of a surface of the top plate and a surface of the positive electrode terminal may be formed in each of the surfaces of the top plate and the positive electrode terminal, which are in contact with the gasket, to increase a contact area when the gasket is melted by heat.

The at least one notch may include at least two or more notches that may be arranged in a row with an interval therebetween.

Here, the at least two or more notches may include one notch that may have a wider width or be more deeply recessed when compared to another notch of the at least two or more notches.

The at least one notch may be formed by irradiating laser onto each of the surfaces of the top plate and the positive electrode terminal, and a material of each of the top plate and the positive electrode terminal may comprise any one of stainless steel or aluminum.

In more detail, the at least one notch may be formed by irradiating the laser onto each of the surfaces of the top plate and the positive electrode terminal, and each of the top plate and the positive electrode terminal may be made of any one of SUS300 series stainless steel containing nickel or SUS400 series stainless steel containing at least one or more of chromium, molybdenum, titanium, or niobium.

Also, the material of the gasket may comprise any one of polyether ether ketone (PEEK), polyphenylene sulfide (PPS), polypropylene (PP), polyester (PET), polybutylene terephthalate (PBT), crohexylenedimethylene terephthalate (PCT), or polytetrafluoroethylene (PTFE).

Also, the top plate may have a recess part having a thinner thickness at a contact point with the gasket than that of remaining portions of the top plate, and the gasket may be disposed to be in contact with a surface of the recess part.

Advantageous Effects

According to the present invention having the above technical characteristics, since the positive electrode terminal to the top plate are bonded to each other through the gasket that seals the gap between the positive electrode terminal and the top plate, the riveting of the positive electrode terminal or the coupling structure similar to the riveting may be eliminated, and thus, the total thickness of the secondary battery may be thinner.

The notch may be formed on each of the surface of the top plate and the surface of the positive electrode terminal, and thus, when the gasket is melted by the heat, the contact area may increase. That is, the contact area between the positive electrode terminal and the gasket and between the top plate and the gasket may increase, and thus, the bonding between the positive electrode terminal and the top plate may further increase.

In addition, the notch may increase in contact area to improve the bonding and also change the discharge passage to more efficiently suppress the leakage of the electrolyte.

At least two or more notches may be formed, and one notch may have the wider width or the more deeply recessed shape when compared to the other notch. Therefore, it is possible to further increase in bonding and sealing of the gasket at the specific point.

In addition, the notch may be formed by irradiating the laser on each of the surfaces of the top plate and the positive electrode terminal, and the material of each of the top plate and the positive electrode terminal may be any one of stainless steel and aluminum. Therefore, each of the top plate and the positive electrode terminal may be made of the material having the strong corrosion resistance to suppress the occurrence of rust.

Furthermore, since the top plate has the recess part having the thinner thickness than that of each of other portions at the point that is in contact with the gasket, and the gasket is disposed to be in contact with the surface of the recess part, the portion of the top plate, to which the gasket and the positive electrode terminal are coupled, may be more effectively reduced in thickness.

In the positive electrode terminal, since the hook or the protrusion protrudes to the outside of the top plate, the external exposed area may be formed to be relatively narrow or wide according to the size of the top plate.

The gasket may be bonded through the ultrasonic waves and the adhesive. Here, before the bonding, the primer may be applied, and the surface may be reformed to further increase in bonding.

MODE FOR CARRYING OUT THE INVENTION

Figure 1:
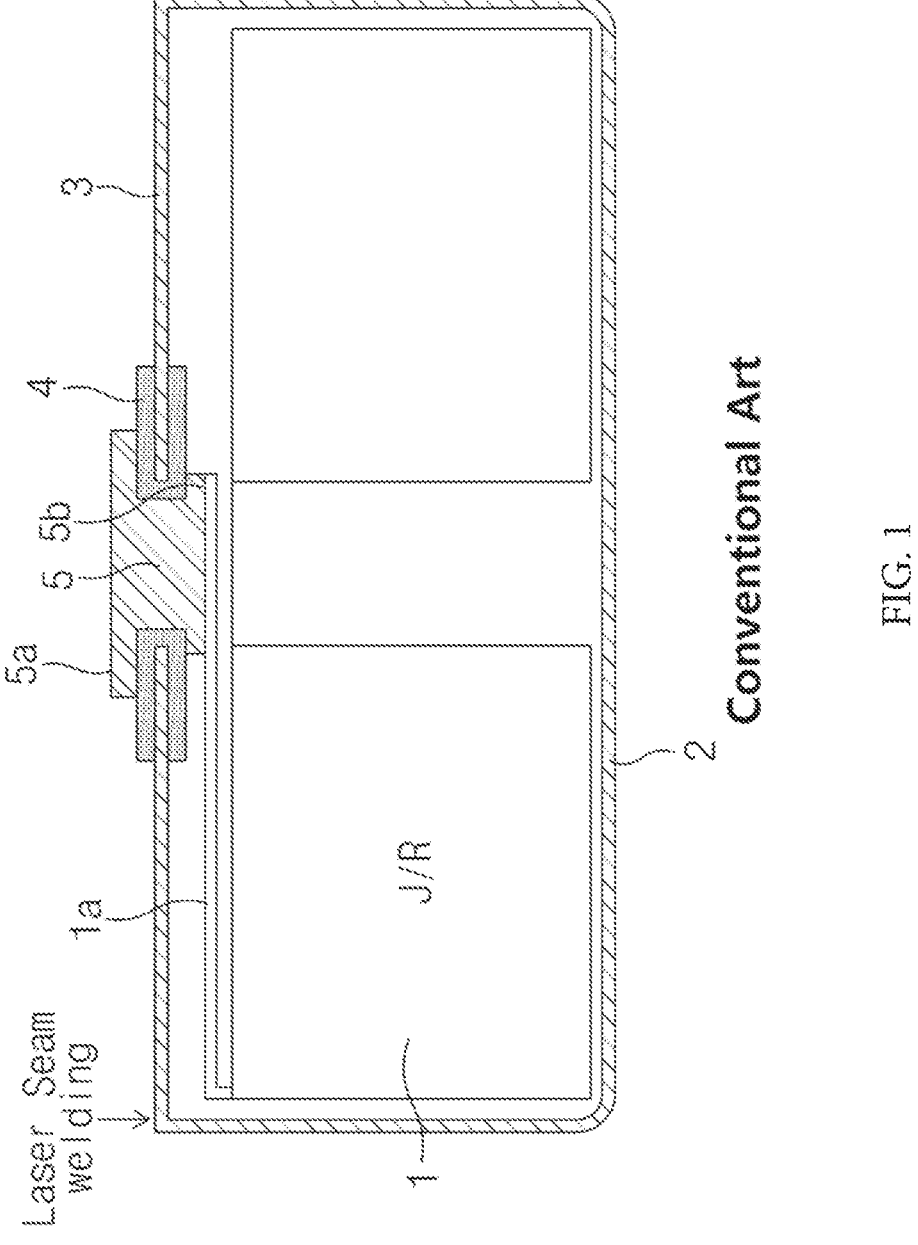
FIG. 1 is a cross-sectional view of a button-type battery according to a related art.

Hereinafter, preferred embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein.

In order to clearly describe the present invention, parts irrelevant to the description are omitted, and the same reference numerals are assigned to the same or similar components throughout the specification.

Also, terms or words used in this specification and claims should not be restrictively interpreted as ordinary meanings or dictionary-based meanings, but should be interpreted as meanings and concepts conforming to the scope of the present invention on the basis of the principle that an inventor can properly define the concept of a term to describe and explain his or her invention in the best ways.

The present invention relates to a button-type secondary battery in which a top plate is coupled to an upper end of a cup when an electrode assembly and an electrolyte are mounted inside the cup having an upper side opened, and more particularly, to a button-type secondary battery having an improved structure so as to have a thinner thickness. Hereinafter, a button-type secondary battery according to an embodiment of the present invention will be described in more detail with reference to the accompanying drawings.

First Embodiment

Figure 2:
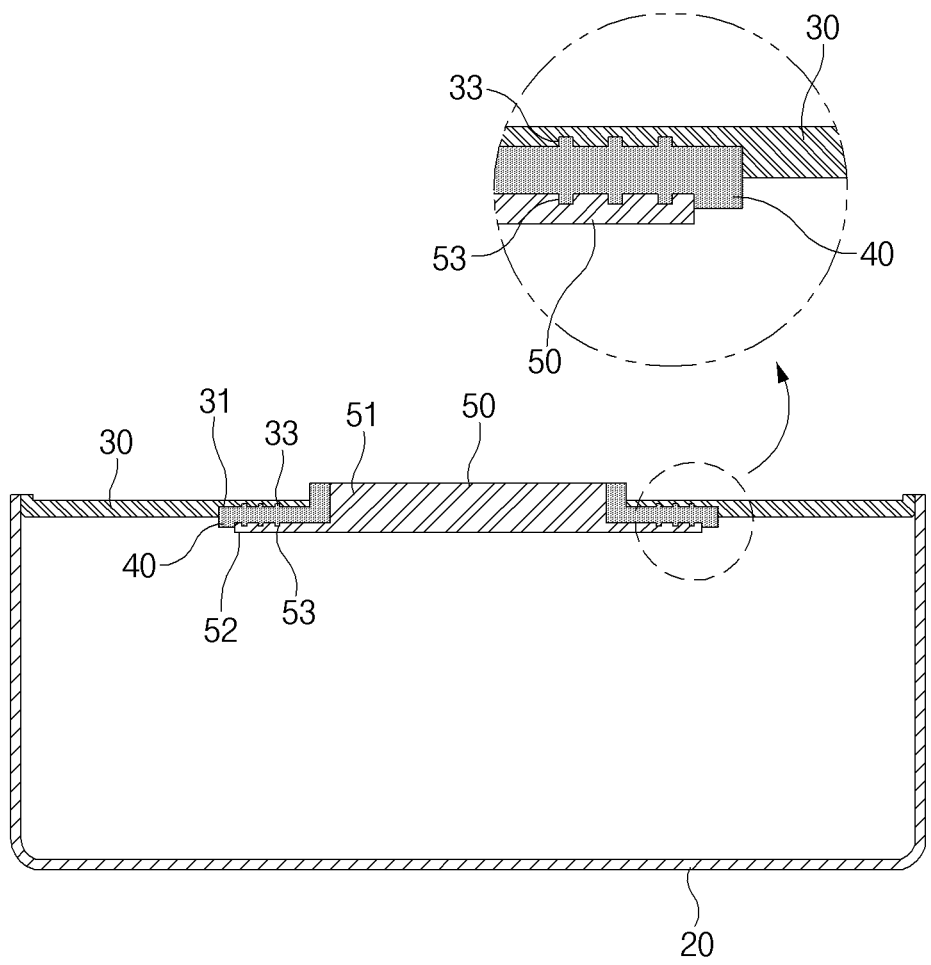
FIG. 2 is a cross-sectional view of a button-type battery according to the present invention.
Figure 3:
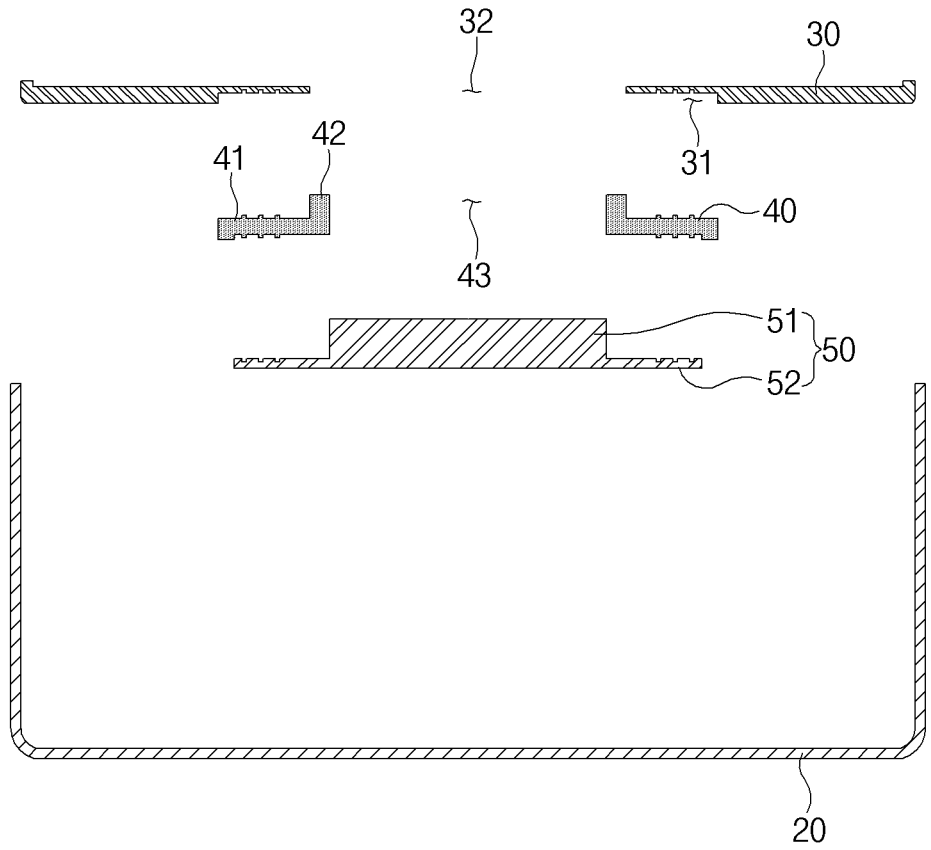
FIG. 3 is an exploded cross-sectional view of the button-type battery illustrated in FIG. 2.

FIG. 2 is a cross-sectional view of a button-type battery according to the present invention, and FIG. 3 is an exploded cross-sectional view of the button-type battery illustrated in FIG. 2.

As illustrated in FIGS. 2 and 3, a cup 20 according to this embodiment has a cylindrical shape similar to a Petri-dish shape, like the conventional structure, and has a structure in which an internal space is formed, and an upper side thereof is opened.

The opened upper side of the cup 20 is bonded through welding in a state in which edges of a top plate 30 are in contact with each other, for example, is bonded after mounting a jelly roll-type electrode assembly (not shown) that is wound in a state in which a positive electrode, a separator, and a negative electrode are stacked. Before the electrode assembly is mounted in the cup 20, a positive electrode tab (not shown) extending from the positive electrode is connected to a positive electrode terminal 50, and a negative electrode tab (not shown) extending from the negative electrode is bonded to an inner surface of the cup 20. Then, when the electrode assembly is mounted, an electrolyte is injected into the cup 20, and a top plate is bonded.

In this embodiment, the top plate 30 has an outer diameter equal to an inner diameter of the cup 20 (when the top plate is fitted into the cup) so as to cover the upper side of the cup 20 or has a disk shape having an outer diameter greater than the inner diameter of the cup 20 (when the top plate is seated on the cup).

In addition, an edge portion of the top plate 30 is fixed and coupled to an upper end of the cup 20 through welding along a circumference thereof. Here, the welding between the top plate 30 and the cup 20 may be performed in various manners, but it is preferable to perform laser seam welding, which is advantageous for securing airtightness and has small surface deformation.

The top plate 30 has a through-hole 32 formed at a center (or a point out of the center in some cases) so that the positive electrode terminal 50 is coupled, and the positive electrode terminal 50 electrically connected to the positive electrode tab (or the negative electrode tab in some case) of the electrode assembly is mounted in the through-hole 32.

The positive electrode terminal 50 according to this embodiment comprises a protrusion 51 having a diameter that is capable of being inserted into the through-hole 32 and a hook 52 expended from one side (an upper side or lower side) of both sides of the protrusion 51 to have a diameter greater than that of the through-hole 32.

Also, according to this embodiment, in the positive electrode terminal 50, the protrusion 51 is inserted into the through-hole 32 (from a lower side in FIG. 3) and then coupled so that the hook 52 is disposed inside the cup (at a side facing the electrode assembly).

However, before the positive electrode terminal 50 is inserted into the through-hole 32, the positive electrode terminal 50 is inserted into the through-hole 32 in a state in which the gasket 40 coupled thereto. Alternatively, instead of being coupled to the positive electrode terminal 50, the gasket 40 may be seated first on the through-hole 32, and then the positive electrode terminal 50 may be inserted so that the gasket 40 is mounted.

For the purpose of electrical insulation between the positive electrode terminal 50 and the top plate 30 through the gasket 40, the protrusion 50 and the hook 52 of the positive electrode terminal 50 are mounted at a position at which the gasket 40 is in contact with the top plate 30, and then, the positive electrode terminal 50 and the top plate 30 are isolated to be electrically insulated from each other. Thus, the gasket 40 may have a structure which has a portion 41 placed on the hook 52 and a portion 42 surrounding the protrusion 51, and in which a hole 43 is formed so that the protrusion 51 is fitted.

In addition, the gasket 40 not only seals a gap between the positive electrode terminal 50 and the top plate 30, but also provides a function of fixing and bonding the positive electrode 50 to the top plate 30.

That is, the gasket 40 is made of a thermoplastic resin that is thermally fused when heat is applied. For example, as illustrated in FIG. 2, the positive electrode terminal 50 and the top plate 30 are coupled to each other, and then, in the state in which the gasket 40 is inserted between the positive electrode terminal 50 and the top plate 30, when heat and a pressure are applied, the gasket 40 is thermally fused, and the gasket 40 is cooled to generate bonding between the positive electrode terminal 50 and the top plate 30 to be coupled to each other.

Therefore, the gasket 40 according to the present invention may be made of thermoplastic resins capable of realizing the thermal fusion. For example, the material of the gasket 40 may be selected to contain one or more or selected from a combination of two or more of polyether ether ketone (PEEK), polyphenylene sulfide (PPS), polypropylene (PP), polyester (PET), polybutylene terephthalate (PBT), crohexylenedimethylene terephthalate (PCT), and polytetrafluoroethylene (PTFE). Alternatively, other polymer resins that are thermally fused to generate adhesive may be also adopted for the material of the gasket 40.

The gasket 40 may be adjusted in heating temperature and pressure intensity according to characteristics of the material thereof.

In addition, in order to improve the bonding of the gasket 40, when manufacturing the gasket 40, an adhesive component that causes bonding when heat is applied may be added as an additive in addition to the original raw material.

Second Embodiment

In the present invention, a structure, which is equal to the structure according to the first embodiment and is capable of generating greater bonding by increasing in contact area between a positive electrode terminal 50 and a top plate through a gasket 40, is provided as a second embodiment.

As illustrated in FIGS. 2 and 3, in this embodiment, notches 33 and 53, each of which has a shape recessed by a predetermined depth from a surface to increase in contact area when the gasket 40 is melted by heat, are formed in surfaces of the top plate 30 and the positive electrode terminal 50, which are in contact with the gasket 40.

Figure 4:
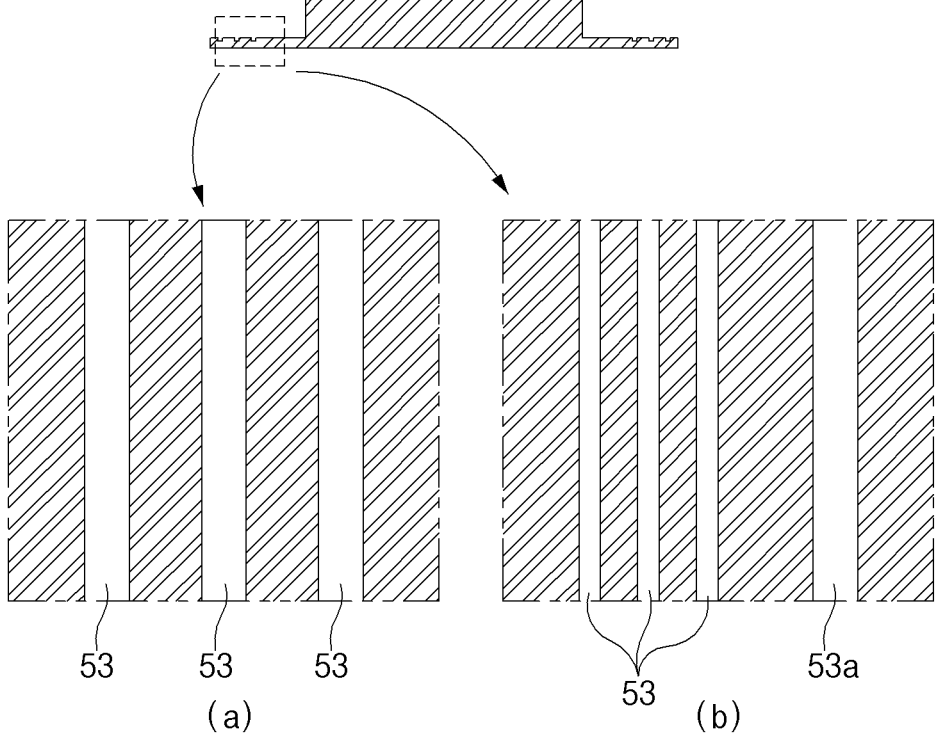
FIG. 4 is a view of a positive electrode terminal according to the present invention, i.e., an enlarged plan view of a portion at which a notch is formed.
Figure 5:
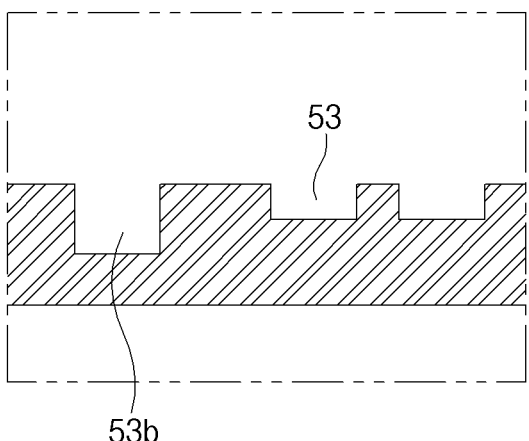
FIG. 5 is a view of the positive electrode terminal according to the present invention, i.e., an enlarged side view of the portion at which the notch is formed.

As illustrated more clearly in FIGS. 4 and 5 that a configuration of the positive electrode terminal according to the present invention, i.e., illustrate enlarged plan and side views of the portion at which the notch is formed, the notches 33 and 53 are formed by processing portions of the surfaces of the top plate 30 and the positive electrode terminal 50 to be partially cut off.

The notches 33 and 53 may be processed by various processing methods, for example, may be processed by irradiating a laser on the surfaces of the top plate 30 and the positive electrode terminal 50. That is, when a laser having an appropriate output is irradiated onto the surfaces of the top plate 30 and the positive electrode terminals 50, portions of the surfaces of the top plate 30 and the positive electrode terminal 50 may be melted and evaporated by high-temperature heat of the laser to form the notches 33 and 53 at the melted and evaporated portions.

However, instead of the laser processing, a cutting tool that cut the metal surface may be used. However, in the processing method using such a tool, as the top plate 30 and the positive electrode terminal 50 become thinner, probability of an occurrence of defects increases, or the processing is limited due to the thickness. As a result, the processing method using the laser as described above may be more desirable.

In this embodiment, it is preferable that at least two or more notches 33 and 53 are formed. Here, the notches 33 and 35 are disposed to form a constant row with an interval therebetween. However, in order to increase in contact area at a specific portion, one of the notches 53a and 53b may be formed to have a wider width or more deeply recessed shape when compared to the other notch 53.

For example, as illustrated in FIG. 4, all the notches 53 may have the same width (see '(a)' of FIG. 4), or as illustrated in '(b)' of FIG. 4, one of the plurality of notches 53 may have a recessed shape to have a wider area.

In the notch 53a having the wide area as described above, since the melted gasket is bonded more widely than other places, greater bonding may be provided. In addition, as illustrated in FIG. 5, since one notch 53b is recessed more deeply than the other notch 53, the bonding may be improved. As described above, the configuration in which the notch varies in width and depth may be achieved by adjusting an output or irradiation width of the laser irradiated during the processing of the notch. Such a structure in which the width and depth of the notch 53 are irregular may be more efficient in preventing leakage of the electrolyte injected into the cup 20.

Also, the expanding of the depth and width of the notch 53 as described above may be appropriately adjusted in consideration of a thickness of each of the positive electrode terminal 50 and the top plate 30.

In this embodiment, each of the top plate 30 and the positive electrode terminal 50 may be made of any one of stainless steel and aluminum so that the notch 53 as described above is processed through the laser so as to prevent rust from being generated.

For example, since the notch 53 is formed by irradiating the laser onto each of the surfaces of the top plate 30 and the positive electrode terminal 50, each of the top plate 30 and the positive electrode terminal 50 may be made of any one of SUS300 series stainless steel containing nickel and SUS400 series stainless steel containing at least one or more of chromium, molybdenum, titanium, or niobium.

Furthermore, in this embodiment, the top plate 30 may comprise a recess part 31 having a thickness less than that of the other portion at a contact point with the gasket 40 to minimize the thickness (in the state in which the top plate and the positive electrode terminal are coupled to each other) while maintaining a protruding height of the protrusion 51 of the positive electrode terminal 50. Here, the gasket 40 may be disposed at a contact position with the recess part 31.

Third Embodiment

Figure 6:
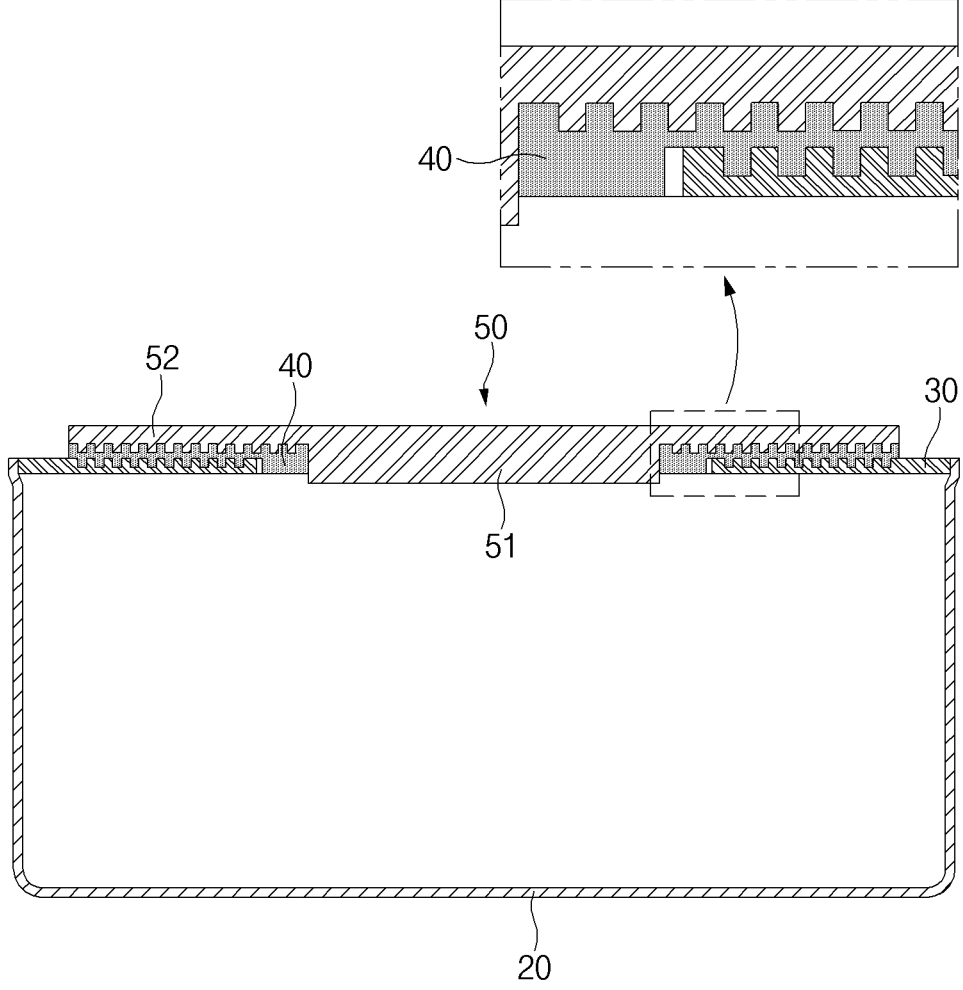
FIG. 6 is a cross-sectional view illustrating a state in which the positive electrode terminal is coupled to a top plate in a state of being turned over with respect to the state of FIG. 2.

In the present invention, as illustrated in FIG. 6, which illustrates a structure in which a notch is formed in each of a positive electrode terminal 50 and top plate 30, similar to the second embodiment, i.e., illustrates a state in which the positive electrode terminal 50 is coupled to the top plate 30 in a state of being turned over with respect to the state of FIG. 2, the structure, in which the positive electrode terminal is coupled in the state of being turned over with respect to the state in the second embodiment is provided as a third embodiment.

In this embodiment, a notch is formed in a gasket 40 to increase in contact area between the positive electrode terminal 50 and the top plate 30, thereby generating greater adhesive. Also, the positive electrode terminal 50 has a structure in which a protrusion 51 is fitted into a through-hole 32 so that a hook 52 is disposed at the outside, thereby increasing in area of the positive electrode terminal 50 exposed to the outside of the top plate 30.

Like the second embodiment, even in this embodiment, the gasket 40 melted by heat is penetrated into the notch that is recessed by a predetermined depth from each of a surface of the top plate 30 and a surface of the positive electrode terminal 50 to increase in contact area.

Even in this embodiment, it is preferable that at least two or more notches are formed. Here, the notches are disposed to form a constant row with an interval therebetween.

Also, in order to increase in contact area at a specific portion, one notch may have a wider width or more deeply recessed shape when compared to the other notch.

Fourth Embodiment

In the present invention, a structure in which a positive electrode terminal is coupled to the top plate in a state of being turned over, and bonding increases through other methods is provided as a fourth embodiment.

Figure 7:
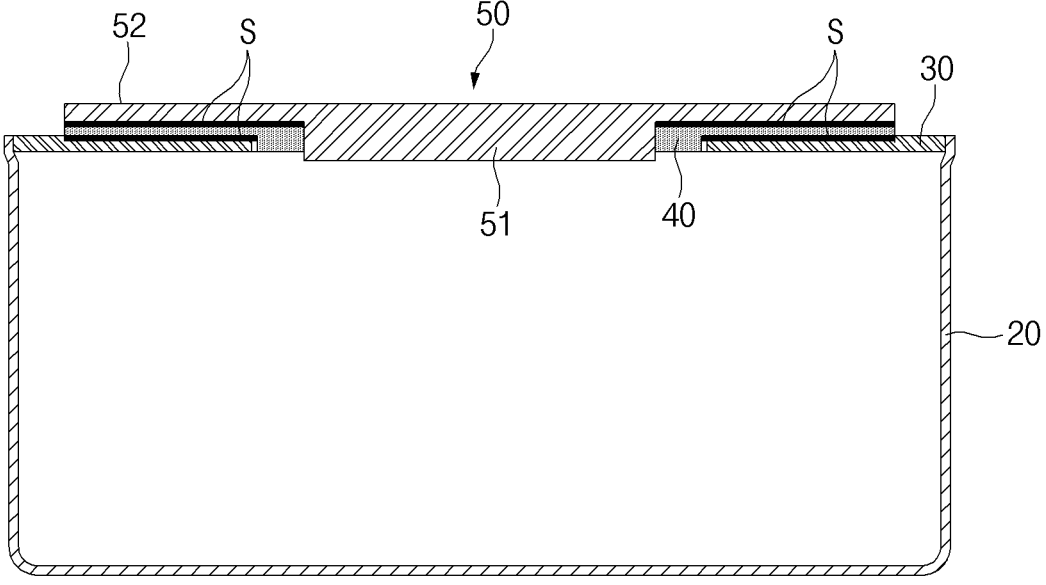
FIG. 7 is view illustrating a state in which the positive electrode is coupled to in the state of being turned over, i.e., a cross-sectional view of a portion S at which bonding is performed on a contact surface with a gasket by applying an adhesive or irradiating ultrasonic waves.

That is, referring to FIG. 7, which illustrates a portion S at which bonding is performed on a contact surface with a gasket by applying an adhesive or irradiating ultrasonic waves, even in this embodiment, a structure, in which bonding through welding is performed in a state in which an edge of a top plate 30 is in contact with an opened upper side of a cup 20, and a positive electrode terminal 50 is coupled to the top plate 30. Here, in the positive electrode terminal 50, a protrusion 51 is inserted into a through-hole 32 so that a hook 52 is disposed at the outside.

Similarly, the gasket 40 electrically insulates the positive electrode terminal 50 and the top plate 30 from each other and also bonds the positive electrode terminal 50 to the top plate 30.

Like the first embodiment, the gasket is thermally fused when heat is applied, and thus, the positive electrode terminal and the top plate may be bonded to each other In this embodiment, in a state in which the gasket 40 is disposed between the positive electrode terminal 50 and the top plate 30, ultrasonic waves may be applied to the gasket 40 by passing through one of the positive electrode terminal 50 and the top plate 30.

The gasket 40 to which the ultrasonic waves are applied is heated by ultrasonic energy, and the bonding S may be performed on a contact surface between the positive electrode terminal 50 and the top plate 30.

Alternatively, when the ultrasonic waves are applied, there is an advantage of minimizing a thickness of the bonded surface, but there is a problem that a production time increases. Therefore, in order to reduce the production time, the step of heating the gasket 40 comprising the step of applying the ultrasonic waves may be eliminated, and an adhesive may be applied to the contact surface of the gasket 40 to perform the bonding. Therefore, when the gasket 40 is inserted between the positive electrode terminal 50 and the top plate 30 in a state in which an adhesive is applied on the surface, the positive electrode terminal 50 and the top plate 30 may be bonded to each other.

In this embodiment, a primer may be applied, or plasma may be applied to further improve the bonding performance of the gasket 40, and thus, the surface may be reformed.

In the present invention having the configuration as described above, since the gasket 40 sealing a gap between the positive electrode terminal 50 and the top plate 30 bonds the positive electrode terminal 50 to the top plate 30, riveting of the positive electrode terminal 50 may be eliminated, and thus, the total thickness of the secondary battery may be thinner.

Notches 33 and 53 may be formed in the surface of the top plate 30 and the surface of the positive electrode terminal 50 to increase in contact area when the gasket 40 is melted by heat. That is, the bonding may be further improved.

In addition, the notches 33 and 53 may increase in contact area to improve the bonding and also change a discharge passage to more efficiently suppress the leakage of the electrolyte.

At least two or more notches 33 and 53 may be formed, and one notch may have the wider width or more deeply recessed shape when compared to the other notch. Therefore, it is possible to further increase in bonding and sealing of the gasket at the specific point.

In addition, the notches 33 and 53 may be formed by irradiating the laser on the surfaces of the top plate 30 and the positive electrode terminal 50, and the material of each of the top plate 30 and the positive electrode terminal 50 may be any one of stainless steel and aluminum. Therefore, each of the top plate 30 and the positive electrode terminal 50 may be made of the material having strong corrosion resistance to suppress an occurrence of rust.

Furthermore, since the top plate 30 has a recess part 31 having a thinner thickness than that of each of other portions at a contact point with the gasket, and the gasket 40 is disposed to be in contact with a surface of the recess part 31, a portion of the top plate to which the gasket and the positive electrode terminal are coupled, may be more effectively reduced in thickness.

In the positive electrode terminal, since the hook or the protrusion protrudes to the outside of the top plate, the external exposed area may be formed to be relatively narrow or wide according to the size of the top plate.

The gasket may adhere through the ultrasonic waves and the adhesive. Here, before the adhesion, the primer may be applied, and the surface may be modified to further increase in adhesion.

While the embodiments of the present invention have been described with reference to the specific embodiments, it will be apparent to those skilled in the art that various changes and modifications may be made without departing from the spirit and scope of the invention as defined in the following claims.

DESCRIPTION OF THE SYMBOLS

20: Cup
30: Top plate
40: Gasket
50: Positive electrode terminal

The invention claimed is:

1. A button-type secondary battery comprising:
   a cup having an opened upper side, the cup being configured to receive an electrode assembly and an electrolyte therein;
   a top plate coupled to an upper end of the cup to close the opened upper side of the cup, the top plate having a through-hole therein;
   a positive electrode terminal comprising a protrusion having a diameter capable of being inserted into the through-hole and a hook having a diameter greater than that of the through-hole, the protrusion being inserted into the through-hole so that the hook is disposed outside or inside the cup, the protrusion being free of a flange; and
   a gasket insulating a portion at which the protrusion and the hook are in contact with the top plate when the protrusion of the positive electrode terminal is inserted into the through-hole,
   wherein the gasket bonds the positive electrode terminal to the top plate.

2. The button-type secondary battery of claim 1, wherein the gasket seals a gap between the positive electrode terminal and the top plate.

3. The button-type secondary battery of claim 2, wherein, in the positive electrode terminal, the protrusion is inserted into the through-hole of the top plate so that the hook is disposed at the outside of the cup.

4. The button-type secondary battery of claim 2, wherein, in the positive electrode terminal, the protrusion is inserted into the through-hole of the top plate so that the hook is disposed at the inside of the cup.

5. The button-type secondary battery of claim 2, wherein, when heat is applied, the gasket is thermally fused to bond the positive electrode terminal and the top plate to each other.

6. The button-type secondary battery of claim 2, wherein ultrasonic waves are applied to the gasket to fuse the gasket between the positive electrode terminal and the top plate.

7. The button-type secondary battery of claim 2, wherein the gasket is inserted between the positive electrode terminal and the top plate in a state in which an adhesive is applied to a surface of the gasket.

8. The button-type secondary battery of claim 7, wherein a primer is applied to the gasket, or plasma is applied to the gasket, to deform a surface of the gasket before the adhesive is applied to the gasket.

9. The button-type secondary battery of claim 2, wherein each of a surface, on which the gasket and the top plate are in contact with each other, and each of a surface, on which the gasket and the positive electrode terminal are in contact with each other, is formed as a flat surface.

10. The button-type secondary battery of claim 2, wherein at least one notch that is recessed by a predetermined depth from each of a surface of the top plate and a surface of the positive electrode terminal is formed in each of the surfaces of the top plate and the positive electrode terminal, which are in contact with the gasket, to increase a contact area when the gasket is melted by heat.

11. The button-type secondary battery of claim 10, wherein the at least one notch includes at least two or more notches that are arranged in a row with an interval therebetween.

12. The button-type secondary battery of claim 10, wherein the at least one notch includes at least two or more notches, and one notch of the at least two or more notches has a wider width or is more deeply recessed when compared to another notch of the at least two or more notches.

13. The button-type secondary battery of claim 10, wherein the at least one notch is formed by irradiating a laser onto each of the surfaces of the top plate and the positive electrode terminal, and wherein a material of each of the top plate and the positive electrode terminal comprises any one of stainless steel or aluminum.

14. The button-type secondary battery of claim 10, wherein the at least one notch is formed by irradiating a laser onto each of the surfaces of the top plate and the positive electrode terminal, and each of the top plate and the positive electrode terminal is made of any one of SUS300 series stainless steel containing nickel or SUS400 series stainless steel containing one or more of chromium, molybdenum, titanium, or niobium.

15. The button-type secondary battery claim 1, wherein a material of the gasket comprises any one of polyether ether ketone (PEEK), polyphenylene sulfide (PPS), polypropylene (PP), polyester (PET), polybutylene terephthalate (PBT), crohexylenedimethylene terephthalate (PCT), or polytetrafluoroethylene (PTFE).

16. The button-type secondary battery of claim 1, wherein the top plate has a recess part having a thinner thickness at a contact point with the gasket than that of remaining portions of the top plate, and the gasket is disposed to be in contact with a surface of the recess part.

17. The button-type secondary battery of claim 1, wherein the protrusion has a constant diameter from the hook to a distal end of the protrusion.

\*  \*  \*  \*  \*